United States Patent
Kitanovski et al.

(10) Patent No.: US 7,481,063 B2
(45) Date of Patent: Jan. 27, 2009

(54) METHOD AND DEVICE FOR THE GENERATION OF COLD AND HEAT BY MAGNETO-CALORIFIC EFFECT

(75) Inventors: Andrej Kitanovski, Ljubljana (SI); Peter Williams Egolf, Niederlenz (CH); Osmann Sari, Prilly (CH)

(73) Assignee: Haute Ecole d'Ingenierie et de Gestion du Canton de Vaud (Heig-VD), Yverdon-les-Bains (CH)

( * ) Notice: Subject to any disclaimer, the term of this patent is extended or adjusted under 35 U.S.C. 154(b) by 329 days.

(21) Appl. No.: 10/540,078

(22) PCT Filed: Dec. 24, 2003

(86) PCT No.: PCT/CH03/00848

§ 371 (c)(1),
(2), (4) Date: Jul. 26, 2005

(87) PCT Pub. No.: WO2004/059222

PCT Pub. Date: Jul. 15, 2004

(65) Prior Publication Data

US 2006/0080979 A1    Apr. 20, 2006

(30) Foreign Application Priority Data

Dec. 24, 2002    (CH)    ................................. 2212/02

(51) Int. Cl.
*F25B 21/00*    (2006.01)
(52) U.S. Cl. ............................................. 62/3.1
(58) Field of Classification Search .............. 62/3.1
See application file for complete search history.

(56) References Cited

U.S. PATENT DOCUMENTS 3,108,444 A * 10/1963 Kahn ........................... 62/3.1

(Continued)

FOREIGN PATENT DOCUMENTS

FR    2 525 748    10/1983

(Continued)

OTHER PUBLICATIONS

Pecharsky V K et al: "Effect of alloying on the giant magnetocaloric effect of Gd5 (Si2Ge2)", Journal of Magnetism and Magnetic Materials, Elsevier Science Publishers, Amsterdam, NL, vol. 167, No. 3 Mar. 1, 1997, pp. 1179-1184, XP004092344 ISSN: 0304-9953 figures 4,5 p. L183, paragraph 2-p. L184, paragraph 1.

(Continued)

*Primary Examiner*—William C Doerrler
(74) *Attorney, Agent, or Firm*—Davis & Bujold P.L.L.C.

(57) ABSTRACT

The device (10), for the continuous generation of cold and heat by magneto-calorific effect, comprises a mixture of a heat exchange fluid and particles made from at least one magneto-calorific material, superconductor or phase-change material circulating through a first heat exchanger (11) subject to a magnetic field generated by magnetic device (14), associated with the first heat exchanger (11). On passing into the generated magnetic field, the particles undergo an increase in temperature and heat the mixture in the first heat exchanger (11) and on leaving the magnetic field, the particles undergo a reduction in temperature to cool a mixture entering a second heat exchanger (12). A cold circuit (16) extracts the cold from the second heat exchanger (12) and a hot circuit (15) extracts the heat from the first heat exchanger (11).

4 Claims, 1 Drawing Sheet

U.S. PATENT DOCUMENTS

Figure 1:
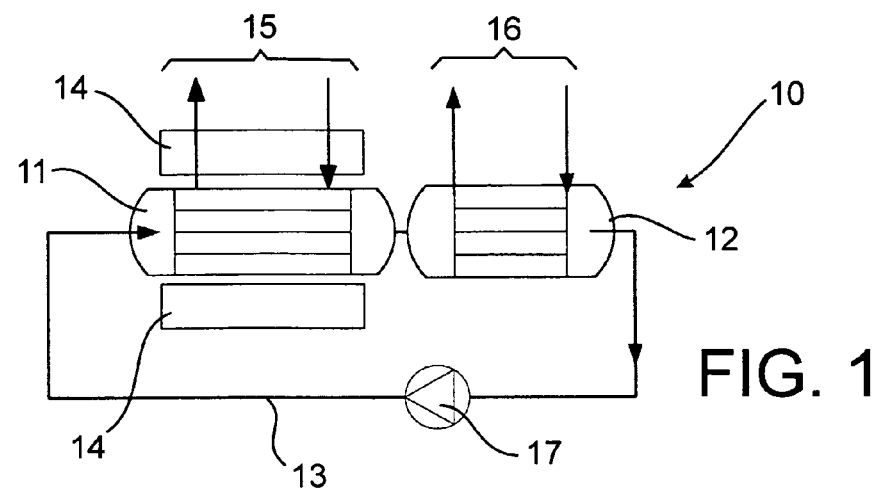

| | | | | |
|---|---|---|---|---|
| 4,392,356 A | * | 7/1983 | Brown | 62/3.1 |
| 4,638,194 A | * | 1/1987 | Keefe | 310/40 R |
| 4,674,288 A | | 6/1987 | Kuriyama et al. | |
| 4,970,866 A | * | 11/1990 | Mokadam | 62/3.1 |
| 5,091,361 A | | 2/1992 | Hed | |
| 5,231,834 A | * | 8/1993 | Burnett | 62/3.1 |
| 5,381,664 A | * | 1/1995 | Bennett et al. | 62/3.1 |
| 6,221,275 B1 | | 4/2001 | Choi et al. | |
| 6,695,974 B2 | * | 2/2004 | Withers et al. | 252/70 |

FOREIGN PATENT DOCUMENTS

| | | |
|---|---|---|
| FR | 2 586 793 | 3/1987 |
| JP | 2002356748 | 12/2002 |

OTHER PUBLICATIONS

Bohigas E et al: "Room-Temperature Magnetic Refrigerator Using Permanent Magnets" IEEE Transactions on Magnetics, IEEE Inc. New York, US, vol. 36, No. 3, May 2000, pp. 538-544, XP000951784 ISSN: 0018-9464 figure 9 p. 542, col. 2, paragraph 2-p. 543, col. 1, paragraph 2.

\* cited by examiner

METHOD AND DEVICE FOR THE GENERATION OF COLD AND HEAT BY MAGNETO-CALORIFIC EFFECT

This application is a national stage completion of PCT/CH2003/000848 filed Dec. 24, 2003 which claims priority from Swiss Application Serial No. 2212/02 filed Dec. 24, 2002.

TECHNICAL DOMAIN

The present invention concerns a method for generating cold and heat by magneto-calorific effect using at least one heat exchanger.

It also concerns a device for generating cold and heat by magneto-calorific effect using at least one heat exchanger.

PRIOR ART

Conventional cold generating devices usually comprise a compressor to compress a cooling fluid in order to raise its temperature and detainment means to decompress said cooling fluid in order to cool it. It has been determined that refrigerants currently used are highly polluting and their use causes considerable atmospheric pollution. Because of this, these refrigerants are no longer responsive to current environmental protection needs.

Devices using magneto-calorific effect to generate cold are already known in the art. In particular, U.S. Pat. No. 4,674,288 describes a helium liquefaction device comprising a magnetizable substance moving within a magnetic field generated by a coil and a helium reservoir in thermal conduction with said coil. The translational movement of the magnetizable substance generates cold that is transmitted to the helium through the intermediary of conductive elements.

French Publication No. FR-A-2 525 748 has as its objective a magnetic refrigerating device comprising a magnetizable material, a system for generating a variable magnetic field, and a means for transferring heat and cold comprising a chamber filled with saturated liquid refrigerant. The magnetizable material generates cold in a position wherein the cold transfer means extract cold from the magnetizable material by condensing a refrigerant, and the magnetizable material generates heat in another position wherein the heat transfer means extract heat from the magnetizable material by boiling another refrigerant.

French Publication No. FR-A-2 586 793 concerns a device comprising a substance which produces heat when it becomes magnetized and produces cold when it is demagnetized and a means for generating a variable magnetic field, said means for generating a magnetic field comprising a superconductive coil and a reservoir containing a cooling element.

U.S. Pat. No. 5,231,834 comprises a magnetic effect heating and cooling device in which a magnetic fluid is pumped through the system. The fluid passes through a magnetic field generated by superconductive magnets or other means. When the fluid penetrates the magnetic field it is heated due to magnetization.

These systems are extremely unreliable in use and have no application to domestic use. Because of this, the systems cannot compete with current refrigeration systems.

DESCRIPTION OF THE INVENTION

The present invention proposes a method and a cooling device for overcoming the disadvantages of known systems, using no polluting refrigeration fluids and thereby eliminating the flaws in prior art systems.

This objective is achieved by the method described in the preamble and characterized by circulating a mixture of transmitting fluid containing particles consisting of at least a magneto-calorific material, a phase-change material, a superconductive material, or a mixture of such materials within a principal circuit consisting of a first heat exchanger and a second heat exchanger connected in series, in that a magnetic field is generated in said first heat exchanger using a magnetic means associated with said first heat exchanger, in that the second heat exchanger is maintained outside said magnetic field in order for said particles to undergo a rise in temperature when they pass through the magnetic field and undergo cooling when they leave the magnetic field, in that heat is extracted from said first heat exchanger using a hot circuit, and in that cold is extracted from said second heat exchanger using a cold circuit.

Advantageously, said transmitting fluid may be in either the liquid or gas state.

According to a first preferred embodiment of the invention said transmitting fluid is a heat-transmitting liquid.

According to a second preferred embodiment of the invention, said transmitting fluid is a nano-fluid.

According to another embodiment of the invention, said transmitting fluid is a suspension.

Said transmitting fluid may also be a multifunctional type fluid.

In a particularly advantageous embodiment, said particles of magneto-calorific material consist of one single material.

Said particles are preferably spherical in shape and their average dimension ranges from 10 µm to 1000 µm.

Interestingly, said particles may have different shapes and dimensions.

The most highly effective method insulates the second heat exchanger from the magnetic field generated in the first heat exchanger.

In a particularly advantageous manner, the mixture in the principal fluid circuit and the hot fluid circuit and/or cold circuit circulate in opposite directions, respectively through said first and said second heat exchanger.

According to another advantageous embodiment, a mixture of heat-transmitting fluid and particles consisting of at least one superconductive material circulates through a principal circuit consisting of a first heat exchanger connected to a second heat exchanger, a magnetic field is generated in said first heat exchanger using magnetic means associated with said first heat exchanger, said mixture circulates through the second heat exchanger situated outside said magnetic field so that the particles of superconductive material undergo a temperature increase when they pass through the magnetic field to heat said mixture in said first heat exchanger, and they undergo cooling when they leave the magnetic field to cool said mixture in said second heat exchanger; heat is extracted from said first heat exchanger using at least one hot circuit, and cold is extracted from said second heat exchanger using at least one cold circuit.

This objective is also realized by the device described in the preamble and characterized in that it comprises:
 a principal circuit consisting of a first heat exchanger and a second heat exchanger connected in series, through which there circulates a mixture of a transmitting fluid containing particles consisting of at least a magneto-calorific material, a phase-change material, a superconductive material, or a mixture of such materials;
 magnetic means designed to generate a magnetic field in said first heat exchanger so that the particles undergo a temperature rise when they pass through said magnetic field and undergo cooling when they leave the magnetic field;

a cold circuit connected to said first heat exchanger; and at least one cold circuit connected to said second heat exchanger.

According to an advantageous embodiment, said magnetic means comprises permanent magnets.

According to another embodiment, said magnetic means comprises electromagnets.

In certain applications, said magnetic means generate a variable magnetic field.

According to a first specific embodiment of the invention, the first heat exchanger comprises an exterior envelope and interior conduits, said interior conduits serving as a vehicle for said heat-transmitting fluid in the hot circuit submerged in the mixture of transmitting fluid and particles from the principal circuit and said magnetic means constituting the exterior envelope of the heat exchanger.

According to a second specific embodiment of the invention, said first heat exchanger comprises an exterior envelope and interior conduits, said interior conduits serving as a vehicle for a heat-transmitting fluid in the hot circuit and submerged in the mixture of transmitting fluid and particles in the principal circuit and said magnetic means constituting a portion of the exterior envelope of the heat exchanger, the other portion consisting of a tube concentric to the magnetic elements.

According to a third specific embodiment of the invention, said first heat exchanger comprises an exterior envelope and interior conduits, said interior conduits serving as a vehicle for said heat-transmitting fluid in the hot circuit submerged in the mixture of transmitting fluid and particles from the principal circuit and said magnetic means constituting the walls of the interior conduits.

According to a fourth specific embodiment, said first heat exchanger comprises an exterior envelope and interior conduits, said interior conduits serving as a vehicle for the mixture of heat-transmitting fluid in the hot circuit submerged in the mixture of transmitting fluid and particles from the main circuit, and said magnetic means constituting a portion of the walls of the interior conduits of the heat exchanger, the other portion consisting of tubes concentric to the magnetic elements disposed inside the tubes.

DESCRIPTIVE SUMMARY OF THE DRAWINGS

The advantages of the present invention will be more apparent from the following description of the various embodiments thereof, with reference to the attached drawings, wherein:

FIG. 1 is a schematic view of one advantageous embodiment of the device of the invention; and FIGS. 2A, 2B, 2C and 2D are transverse cross-sections of specific designs for the first heat exchanger of the device in FIG. 1.

HOW TO ACHIEVE THE INVENTION

With reference to FIG. 1, device 10 is a schematic representation comprising a first heat exchanger 11 connected in series with a second heat exchanger 12 to form a principal circuit 13 through which there circulates a mixture consisting of a heat-transmitting fluid and particles of at least one magneto-calorific material. The first heat exchanger 11 is associated with a magnetic means 14 which generates a magnetic field in said first heat exchanger 11. Its walls are designed to exert no influence on the magnetic field generated and the magnetic field is preferably essentially identical on the interior and the exterior of said first heat exchanger 11. Magnetic means 14 consists of permanent magnets, either electromagnets or any other device capable of creating a magnetic field. It is possible to have a magnetic means 14 which generates a constant magnetic field or a variable magnetic field. In the latter case the system is adapted to suit its intended purpose. Magnetic elements 14 are arranged so that first heat exchanger 11 is totally subjected to the magnetic field generated and the second heat exchanger is arranged so as to be outside the magnetic field. Any type of suitable insulation can be used to accomplish this and provide magnetic insulation for second heat exchanger 12.

Device 10 comprises a first circuit called "hot circuit 15" in which a heat-transmitting fluid is preferably circulated in order to use the heat produced by the magneto-calorific effect, said first circuit being associated with said first heat exchanger 11. It also comprises a second circuit called "cold circuit 16" through which a heat-transmitting fluid is preferably circulated to utilize the temperature lowering associated with the magneto-calorific effect, said second circuit being associated with said second heat exchanger 12.

A pump 17 is attached to the principal circuit 13 to circulate the mixture of heat-transmitting fluid and particles through heat exchangers 11 and 12. Hot circuit 15 and cold circuit 16 are conventional utility circuits respectively used for heating and cooling spaces or enclosures depending upon the application.

The mixture circulating through principal circuit 13 may consist, for example, of a mixture of heat-transmitting fluid in the liquid or gas state preferably having high thermal conductivity and particles consisting of either one or more magneto-calorific materials, either phase-change materials or superconductive materials. The fluid is called transmitting fluid and serves as a vehicle for particles of one or several different types. Actually, the particles transported by the transmitting fluid may be mixtures of magneto-calorific particles and phase-change particles or even superconductive particles. The transmitting fluid may also be a nano-fluid, a suspension, or any other multifunctional type of fluid. The various particle structures that are possible will be described in greater detail below.

The particles may be any shape and any size. They may be the same shape and size or different shapes and sizes. However, for the mixture to have the best dynamic characteristics, the particles are preferably small in size. The average size preferably ranges from 10 to 1000 micrometers. The mixture may be either a homogeneous or a heterogeneous one. The proportion of particles in the mixture is defined to allow the mixture to remain fairly fluid and circulate freely within principal circuit 13. For that reason, this proportion preferably does not exceed 40% of the mass of the mixture and preferably ranges from 15% to 40% of the mass.

The operation of device 10 is based upon the method in which, when magnetic elements 14 generate a magnetic field in first heat exchanger 11, the particles located in this first heat exchanger 11 become magnetized and no longer entropic. Because of this, they undergo a rise in temperature and the heat generated is transmitted by heat exchange to the heat transmitting fluid in which these particles are suspended. The entire mixture located in first heat exchanger 11 subjected to the magnetic field therefore undergoes a rise in temperature. This heated heat-transmitting fluid may be used in utility circuit 15 for any application whatsoever.

The operation of device 10 is based upon the method in which, when magnetic elements 14 generate a magnetic field in first heat exchanger 11, the particles located in this first heat exchanger 11 become magnetized and no longer entropic. Because of this, they undergo a rise in temperature and the heat generated is transmitted by heat exchange to the heat transmitting fluid in which these particles are suspended. The entire mixture located in first heat exchanger 11 subjected to the magnetic field therefore undergoes a rise in temperature. This heated heat-transmitting fluid may be used in utility circuit 15 for any application whatsoever.

As they leave the magnetic field generated in first heat exchanger 11, the particles in the mixture undergo demagnetization and are cooled. The heat transmitting fluid in the mixture located near these particles undergoes cooling. The entire mixture leaving the magnetic field undergoes cooling. The cooled mixture enters second heat exchanger 12 and the cold thus produced may be used for any application whatsoever.

Principal circuit 13 is provided with a flow regulating means (not shown) for conveniently regulating the flow of mixture through the circuit. Device 10 functions optimally when the particles flow at a rate that prevents sedimentation and keeps them in suspension in the mixture for circulation through first and second heat exchangers 11 and 12. When device 10 is used in space applications, the device is in a weightless state and the mixture in principal circuit 13 is no longer subjected to flow constraints. Therefore their parameters are defined so as to optimize cold and heat generation.

Figures 2A, 2C:
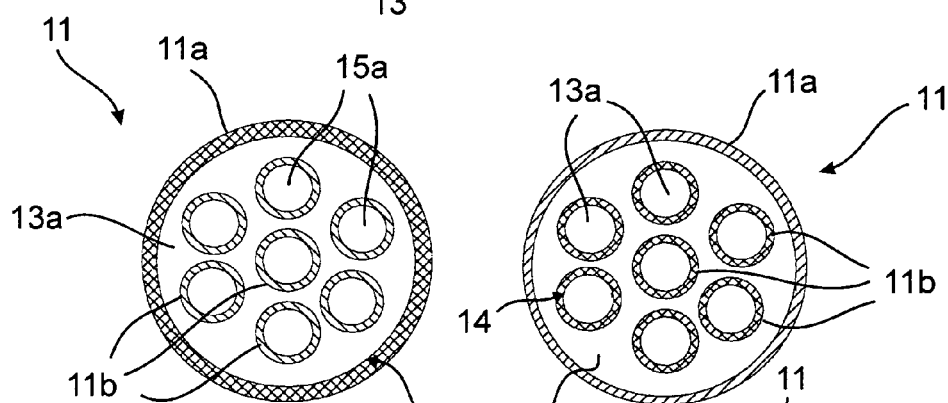

With reference to FIG. 2A, heat exchanger 11 comprises an exterior envelope 11a and interior conduits 11b located inside said exterior envelope. Interior conduits 11b serve as vehicles for heat-transmitting fluid 15a from the hot circuit and are submersed in the mixture of transmitting fluid and particles 13a in principal circuit 13. In this embodiment, magnetic elements 14 constitute exterior envelope 11a of heat exchanger 11.

Figures 2B, 2D:
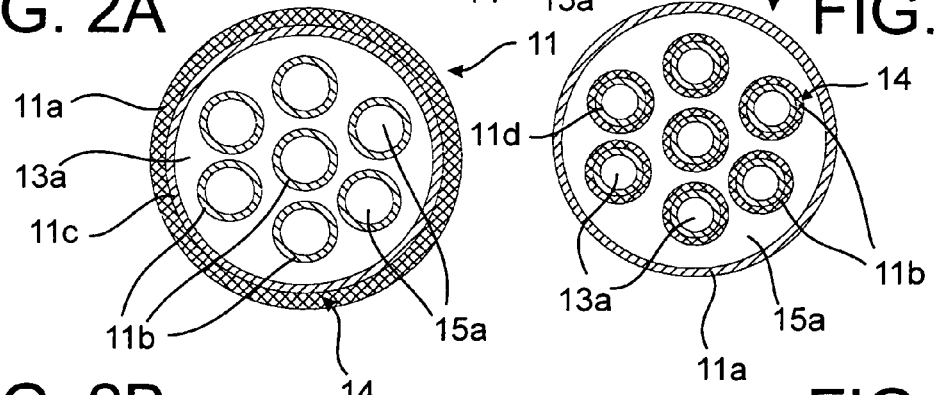

With reference to FIG. 2B, heat exchanger 11 comprises an exterior envelope 11a and interior conduits 11b located inside said exterior envelope. Interior conduits 11b serve as vehicles for heat transmitting fluid 15a from the hot circuit and are submersed in the mixture of transmitting fluid and particles 13a in principal circuit 13. In this embodiment, magnetic elements 14 constitute the exterior portion of the exterior portion of envelope 11a of the heat exchanger, while the interior portion of this envelope consists of a tube 11c concentric to magnetic elements 14.

With reference to FIG. 2C, heat exchanger 11 comprises an exterior envelope 11a and interior conduits 11b located inside said exterior envelope. Interior conduits 11b serve as vehicles for heat-transmitting fluid and particles 13a from the principal circuit and are submersed in heat-transmitting fluid 15a from the hot circuit. The magnetic elements 14 in this embodiment constitute the walls of interior conduits 11b.

With reference to FIG. 2D, heat exchanger 11 comprises an exterior envelope 11a and interior conduits 11b located inside said exterior envelope. Interior conduits 11b serve as vehicles for the mixture of transmitting fluid and particles 13a from principal circuit 13 and are submersed in heat transporting fluid 15a from the hot circuit. The magnetic elements 14 in this embodiment constitute the exterior portion of the walls of interior conduits 11b of heat exchanger 11, with the interior portion of these conduits being formed of tubes 11d concentric to the magnetic elements and located inside them.

The particles of magneto-calorific superconductive or phase-change magnetic materials may have different internal structures. There are available in the industry several magneto-calorific materials, either superconductive or phase-change, that are compatible with the environment, as well as various non-polluting heat-transmitting fluids, all of which are suitable for use with the method of the invention.

The method and the device of the invention can be used in industry, restaurants, the food industry, heating, ventilating and air conditioning systems, refrigeration units for household use and air conditioners, heat pumps, automobiles, trains, planes, space vehicles, etc.

Furthermore, several cascading devices can be connected to increase the efficiency of a unit serving several purposes.

The invention claimed is:

1. A device for generating cold and heat by magnetic effect comprising at least one heat exchanger, the device comprising:
   a principal circuit (13) comprising a first heat exchanger (11) and a second heat exchanger (12) connected in series through which circulates a mixture of transmitting fluid containing particles comprising a magneto-calorific material or a superconductive material or a mixture thereof;
   magnetic elements (14) for generating a magnetic field in the first heat exchanger (11) so that the particles undergo a rise in temperature when passing through the magnetic field and undergo cooling upon leaving the magnetic field;
   a hot circuit (15) connected to the first heat exchanger (11); and
   at least one cold circuit (16) connected to the second heat exchanger (12) wherein
   the first heat exchanger (11) comprises an exterior envelope (11a) and interior conduits (11b), the interior conduits (11b) serving as vehicles for a heat-transmitting fluid (15a) from the hot circuit (15) and submerged in the mixture of transmitting fluid and particles (13a) from the principal circuit (13), the magnetic elements (14) constitute at least a portion of the exterior envelope (11a) of the heat exchanger (11).

2. The device according to claim 1, wherein the magnetic elements (14) constitute a first portion of the exterior envelope (11a) of the heat exchanger and a second portion of the exterior envelope (11a) of the heat exchanger (11) is formed of a tube (11c) concentric to the magnetic elements (14).

3. A device for generating cold and heat by magnetic effect comprising at least one heat exchanger, the device comprising:
   a principal circuit (13) comprising a first heat exchanger (11) and a second heat exchanger (12) connected in series through which circulates a mixture of transmitting fluid containing particles comprising a magneto-calorific material or a superconductive material or a mixture thereof;
   magnetic elements (14) for generating a magnetic field in the first heat exchanger (11) so that the particles undergo a rise in temperature when passing through the magnetic field and undergo cooling upon leaving the magnetic field;
   a hot circuit (15) connected to the first heat exchanger (11); and
   at least one cold circuit (16) connected to the second heat exchanger (12), wherein
   the first heat exchanger (11) comprises an exterior envelope (11a) and interior conduits (11b), the interior conduits (11b) serving as vehicles for a heat-transmitting fluid (13a) from the principal circuit (13) and submerged in a transmitting fluid (15a) from the hot circuit (15), the magnetic elements (14) constitute at least a portion of walls of the interior conduits (11b).

4. The device according to claim 3, wherein the magnetic elements (14) constitute a first portion of the walls of the interior conduits (11b) of the heat exchanger (11) and a second portion of the walls of the interior conduits (11) is formed of tubes (11d) concentric to the magnetic elements (14) and located inside the magnetic elements (14).

* * * * *